3,121,085
HEXACHLOROGLUTARIMIDE

Frederick H. Norton, Concord, Calif., assignor to The Dow Chemical Company, Midland, Mich., a corporation of Delaware
No Drawing. Filed Nov. 5, 1962, Ser. No. 235,553
3 Claims. (Cl. 260—281)

This invention relates to 2,2,3,3,4,4-hexachloroglutarimide and to a method for its purification.

2,2,3,3,4,4-hexachloroglutarimide is a novel compound having the structure

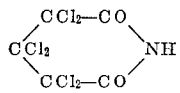

This new compound is a white solid of moderate solubility in organic solvents such as carbon tetrachloride, chloroform, dichloromethane and caustic solutions, and substantially insoluble in water. The compound is useful as a parasiticide and adapted to be employed for the control of numerous plant organisms, as paint preservatives and germicides, and as intermediates in the preparation of biologically active compounds.

The compound of the present invention may be prepared by intimately contacting and reacting chlorine and α-picoline in the presence of water or water vapor. It is necessary and essential for the successful operation of the process that there be present in the reactor and in intimate contact with the reactants, water or water vapor. It is considered that water should be present in an amount of at least about 0.1 mole percent with respect to the organic constituents, i.e., α-picoline and partially chlorinated picolines which are formed during the course of the reaction. The preferred amounts are in the range of from about 1 percent to about 5 percent. Larger amounts may be employed but have not been shown to materially aid in the process. The reaction may be carried out at temperatures in the range of from about 90° C. to about 130° C. The preferred temperature range is from 110° to about 120° C. The reaction is preferably carried out in the presence of ultraviolet light or other actinic light source. The exact amounts of the reactants are not critical but chlorine is employed in excess. A three to ten-fold molar excess of chlorine is considered desirable. The process may be carried out in either a continuous or batch process to obtain the desired product and chlorinated picoline by-products. In a continuous process, the desirable residence time of the organic reactant component is from about 5 to 20 hours. In the batch process, the preferred reaction time is from about 5 to 20 hours.

The 2,2,3,3,4,4-hexachloroglutarimide may be recovered from the reaction mixture by (a) extracting the reaction mixture with dilute caustic and thereafter acidifying the aqueous caustic solution to precipitate the desired product, or (b) distilling the reaction mixture to remove unchlorinated or lower chlorinated α-picolines and thereafter extracting with aqueous caustic the residue with or without prior dilution with an inert solvent such as dichloromethane, followed by acidifying the aqueous caustic solution to precipitate the desired product. The latter method has been found to provide for recovery of the desired product of higher purity. The product may be purified, if desired, by recrystallization from solvents such as carbon tetrachloride.

In a representative example of a continuous process, α-picoline at a rate of about 520 grams per hour and chlorine at a rate of about 4000 grams per hour are fed into a reactor charged with about 800 grams of picoline and 1 gram of water heated to about 100° C. and irradiated with ultraviolet light. The chlorine is bubbled through the picoline liquid effecting good stirring and contact. The reaction mixture reaches steady state of constant composition after about 17 hours with a product composition comprising 13 mole percent of 2,2,3,3,4,4-hexachloroglutarimide and the remainder, chlorinated picoline by-products. The product mixture is bled from the reactor and thereafter distilled under reduced pressure to vaporize off unreacted α-picoline and lower chlorinated picolines, the residue then extracted with aqueous caustic, the aqueous caustic extract acidified to precipitate the desired 2,2,3,3,4,4-hexachloroglutarimide product. The latter is recovered by filtration. 2,2,3,3,4,4-hexachloroglutarimide after recrystallization from carbon tetrachloride melts at 229°–229.5° C. and has a chlorine analysis of 66.50 percent. The theoretical value is 66.52 percent.

In a representative example of a batch process, chlorine gas was bubbled through a mixture of 18.6 grams (0.2 mole) of α-picoline and 19.5 grams of 37 percent aqueous hydrochloric acid and the resulting mixture heated to the boiling point and irradiated with ultraviolet light. During the first ten minutes of the heating, water was allowed to vaporize off to concentrate the mixture; thereafter the heating was carried out under reflux for a total of 18 hours. The temperature during the heating period was in the range of from about 105° to 120° C. At the end of the heating period, the reaction mixture was dissolved in methylene chloride, the resulting solution first washed with water, then made basic with sodium hydroxide to precipitate as a white solid, the sodium salt of hexachloroglutarimide product. The latter was recovered by filtration and dissolved in water; the water solution was then washed with methylene chloride and acidified to obtain 16.7 grams (or 33.5 percent of theory) of the desired 2,2,3,3,4,4-hexachloroglutarimide product. The product after recrystallization from carbon tetrachloride melted at 220° C. The infrared spectrum of the product thus obtained was found to be identical to a product prepared by the continuous process and having the correct elemental analysis.

The product of the present invention is useful as parasiticides for the control of plant organisms, as germicides, as agents for various antimicrobial controls and as preservatives in latex and paint compositions. In a representative operation as antimicrobial agents, complete controls of *Aerobacter aerogenes*, *Bacillus subtilis*, *Salmonella typhosa*, *Staphylococcus aureus*, *Aspergillus terreus*, *Pullularia pullulans* and *Rhizopus nigricans* were obtained when 2,2,3,3,4,4-hexachloroglutarimide was added in separate operations to agar medium thereafter inoculated with one of the organisms and then incubated at 30° C. for 3 days. The product is also useful as an intermediate for the preparation of numerous biologically active compounds including enol esters.

I claim:
1. 2,2,3,3,4,4-hexachloroglutarimide.
2. A method for producing 2,2,3,3,4,4-hexachloroglutarimide which comprises contacting gaseous chlorine with α-picoline in the presence of a minor proportion of water.
3. A method for producing 2,2,3,3,4,4-hexachloroglutarimide which comprises contacting gaseous chlorine with α-picoline in the presence of a minor proportion of water while the reaction mixture is irradiated with ultraviolet light.

No references cited.